US010282300B2

(12) United States Patent
Mondal et al.

(10) Patent No.: US 10,282,300 B2
(45) Date of Patent: May 7, 2019

(54) ACCESSING PHYSICAL MEMORY FROM A CPU OR PROCESSING ELEMENT IN A HIGH PERFORMANCE MANNER

(71) Applicant: Intel Corporation, Santa Clara, CA (US)

(72) Inventors: Sanjoy K. Mondal, Austin, TX (US); Rajesh B. Patel, Austin, TX (US); Lawrence O. Smith, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 79 days.

(21) Appl. No.: 15/652,157

(22) Filed: Jul. 17, 2017

(65) Prior Publication Data

US 2018/0004671 A1      Jan. 4, 2018

Related U.S. Application Data

(63) Continuation of application No. 13/795,247, filed on Mar. 12, 2013, now Pat. No. 9,710,385, which is a
(Continued)

(51) Int. Cl.
*G06F 9/30* (2018.01)
*G06F 12/0862* (2016.01)
(Continued)

(52) U.S. Cl.
CPC ........ *G06F 12/0862* (2013.01); *G06F 9/3016* (2013.01); *G06F 9/30149* (2013.01);
(Continued)

(58) Field of Classification Search
CPC .. G06F 12/0862; G06F 12/10; G06F 12/1027; G06F 12/0888; G06F 9/30149; G06F 9/3016; G06F 9/30181
See application file for complete search history.

(56) References Cited

U.S. PATENT DOCUMENTS

| 5,157,777 A | 10/1992 | Lai |
| 5,317,754 A | 5/1994 | Blandy et al. |

(Continued)

FOREIGN PATENT DOCUMENTS

| EP | 0345589 | 12/1989 |
| EP | 1241579 | 9/2002 |

(Continued)

OTHER PUBLICATIONS

Chinese Patent Office, Second Office Action dated Jan. 18, 2012 in Chinese Application No. 201010128183.7; 10 pages of Office Action including English Translation.
Office Action received for Chinese Patent Application No. 201010128183.7 dated Apr. 11, 2011, 20 pages of Office Action including English Translation.
Notice of Allowance received for Chinese Patent Application No. 200580046263.5, dated Nov. 27, 2009, 4 pages of Notice of Allowance including 2 pages of English Translation.
(Continued)

*Primary Examiner* — Nanci N Wong
(74) *Attorney, Agent, or Firm* — Lowenstein Sandler LLP (57) ABSTRACT

A method and apparatus is described herein for accessing a physical memory location referenced by a physical address with a processor. The processor fetches/receives instructions with references to virtual memory addresses and/or references to physical addresses. Translation logic translates the virtual memory addresses to physical addresses and provides the physical addresses to a common interface. Physical addressing logic decodes references to physical addresses and provides the physical addresses to a common interface based on a memory type stored by the physical addressing logic.

20 Claims, 4 Drawing Sheets

Related U.S. Application Data continuation of application No. 11/004,753, filed on Dec. 2, 2004, now Pat. No. 9,280,473.

(51) Int. Cl.
  *G06F 12/10* (2016.01)
  *G06F 12/1027* (2016.01)
  *G06F 12/0888* (2016.01)

(52) U.S. Cl.
  CPC .......... *G06F 9/30181* (2013.01); *G06F 12/10* (2013.01); *G06F 12/1027* (2013.01); *G06F 12/0888* (2013.01)

(56) References Cited

U.S. PATENT DOCUMENTS

| | | | |
|---|---|---|---|
| 5,623,619 | A | 4/1997 | Witt |
| 5,715,418 | A | 2/1998 | Atsatt |
| 5,732,404 | A | 3/1998 | Johnson |
| 5,752,274 | A | 5/1998 | Garibay |
| 5,895,503 | A | 4/1999 | Belgard |
| 5,913,923 | A | 6/1999 | Dunlap |
| 5,960,466 | A | 9/1999 | Belgard |
| 5,963,984 | A | 10/1999 | Garibay |
| 6,219,774 | B1 | 4/2001 | Hammond |
| 6,351,806 | B1 | 2/2002 | Wyland |
| 6,363,470 | B1 | 3/2002 | Laurenti |
| 6,430,668 | B2 | 8/2002 | Belgard |
| 6,470,444 | B1 | 10/2002 | Sheaffer |
| 6,496,847 | B1 | 12/2002 | Bugnion et al. |
| 6,658,578 | B1 | 12/2003 | Laurenti |
| 6,748,512 | B2 | 6/2004 | Buch |
| 6,785,886 | B1 | 8/2004 | Lim |
| 6,954,837 | B2 | 10/2005 | Woo |
| 7,937,525 | B2 | 5/2011 | Mondal et al. |
| 2002/0073296 | A1 | 6/2002 | Buch |
| 2003/0018877 | A1 | 1/2003 | Gaskins |
| 2004/0073741 | A1 | 4/2004 | Klein |
| 2004/0073766 | A1 | 4/2004 | Arimilli |
| 2004/0193829 | A1 | 9/2004 | Woo |
| 2005/0114610 | A1 | 5/2005 | Robinson |
| 2006/0123184 | A1 | 6/2006 | Mondal |

FOREIGN PATENT DOCUMENTS

| | | |
|---|---|---|
| JP | H01-106149 A | 4/1989 |
| JP | H02-236652 A | 9/1990 |
| JP | H07-093221 A | 4/1995 |
| JP | H08-272693 A | 10/1996 |
| JP | 2000122916 A | 4/2000 |
| JP | 2002288038 A | 10/2002 |
| WO | 2006060220 A2 | 6/2006 |

OTHER PUBLICATIONS

Notice of Allowance received for Chinese Patent Application No. 201010128183.7, dated Jul. 17, 2013, 4 pages of Notice of Allowance including 2 pages of English Translation.

Office Action received for Chinese Patent Application No. 201010128183.7, dated Mar. 4, 2013, 7 pages of Office Action including 4 pages of English Translation.

R.M. Shui, J.C. Chiu, S.K. Cheng and J.J. Shann, "Decoding of CISC Instructions in Superscalar Processor With High Issue Rate," Mar. 14, 2000, IEEE Proc. Comput. Digit. Tech., vol. 147, No. 2, pp. 101-107.

Webopedia, "http://www.webopedia.com/TERM/R/register.html", Webopedia.com, Oct. 30, 2001, pp. 1-3.

The State Intellectual Property Office of the People's Republic of China, Office Action dated Jul. 3, 2012 in Chinese Application No. 201010128183.7.

German Patent and Trademark Office, Decision dated Jul. 5, 2012 and Minutes of the Apr. 7, 2012 Hearing in German Application No. 201010128183.7, 10 pages.

German Patent and Trademark Office, Decision dated Jul. 5, 2012 and Minutes of the Apr. 7, 2012 Hearing in German Application No. 11 2005 003 098.9, 17 pages.

Office Action received for Japanese Patent Application No. 2007-544385 dated Jul. 12, 2011, 4 pages of Office Action including 2 pages of English translation.

Office Action received for Chinese Patent Application No. 200580046263.5 dated Aug. 7, 2009, 7 pages of Office Action including English translation.

Office Action received for German Patent Application No. 11 2005 003 098.9 dated Sep. 1, 2010, 12 pages of Office Action including English translation.

International Preliminary Report on Patentability and Written Opinion received for PCT Application No. PCT/US2005/042154, dated Jun. 14, 2007, 10 pages.

Office Action received for German patent Application No. 11 2005 003 098.9 dated Jun. 12, 2009, 7 pages of Office Action including English translation.

Office Action received for German Patent Application No. 11 2005 003 098.9 dated Jan. 24, 2008, 15 pages of Office Action including English translation.

Office Action received for Chinese Patent Application No. 200580046263.5 dated Aug. 8, 2008, 14 pages of Office Action including English translation.

Office Action received for Japanese Patent Application No. 2007-544385 dated Jun. 15, 2010, 4 pages of Office Action including English translation.

PCT/US2005/042154 International Search Report and Written Opinion dated Sep. 10, 2006, 14 pages.

U.S. Appl. No. 10/876,509, filed Jun. 25, 2004, entitled "A Virtual Machine Control Structure Identification Decoder," Sanjoy Mondal et al.

ACCESSING PHYSICAL MEMORY FROM A CPU OR PROCESSING ELEMENT IN A HIGH PERFORMANCE MANNER

CROSS-REFERENCE TO RELATED APPLICATIONS

This application is a continuation of U.S. patent application Ser. No. 13/795,247, filed Mar. 12, 2013, which is a continuation of U.S. patent application Ser. No. 11/004,753, filed Dec. 2, 2004, the contents of which are hereby incorporated by reference.

TECHNICAL FIELD

This invention relates to the field of processors and, in particular, to accessing memory with a processing element.

BACKGROUND

As processing resources have increased, demands to run multiple software programs and operating systems on a single microprocessor have also increased. An environment, referred to as virtual machine extension (VMX) architecture, typically, allocates a single processor's resources to various software application and operating systems. Therefore, a single microprocessor's or multiple processing element's resources may be divided between multiple operating systems and multiple applications, which allows a user to potentially increase their usage on a computing platform.

Typically, in a VMX environment, a virtual machine monitor (VMM) program interfaces with one or more software programs, such as a virtual machine (VM) program, and a single or multiple microprocessors. A virtual machine (VM) may include guest software, such as an operating system (OS) or other software applications. Usually, to allow multiple VMs to run on a single processor the state information and control information for the VMM and each VM program is stored in memory.

One structure commonly used for storing such state and control information is a virtual machine control structure (VMCS). Storing the VMCS in the microprocessor can potentially make addressing the VMCS architecture specific; therefore, the VMCS is typically located in a portion of main system memory.

However, locating the VMCS in system memory usually creates addressing limitations for micro-processors that use virtual memory addressing. Typically, a microprocessor that utilizes virtual memory generates a linear address for a memory location to be fetched or written to. That linear address is translated by a translation unit in the microprocessor to a physical address of the memory location in a system memory. Although, the VMCS portion of the system memory may be addressed in this manner, errors in the translation process, such as a page fault, are difficult to handle in a VMX environment. Therefore, many instructions, such as VMWRITE, VMREAD, and other VMX instructions, physically address a memory location in system memory, rather than providing a linear address to be translated.

In a microprocessor that utilizes virtual memory paging, a VMX instruction may need to access physical memory directly without linear to physical address translation however, current systems usually require disabling the virtual memory paging and flushing of the linear to physical address translation buffer before a direct physical address access to memory can occur. The amount of time needed to disabling paging and flush the translation buffer typically incurs a large execution time penalty.

DESCRIPTION OF DRAWINGS

The present invention is illustrated by way of example and not intended to be limited by the figures of the accompanying drawings.

DETAILED DESCRIPTION

In the following description, numerous specific details are set forth such as a specific virtual machine environment, specific components, and specific functional blocks in order to provide a thorough understanding of the present invention. It will be apparent, however, to one skilled in the art that these specific details need not be employed to practice the present invention. In other instances, well known components or methods, such well-known functional blocks of a microprocessor, etc., have not been described in detail in order to avoid unnecessarily obscuring the present invention.

Figure 1:
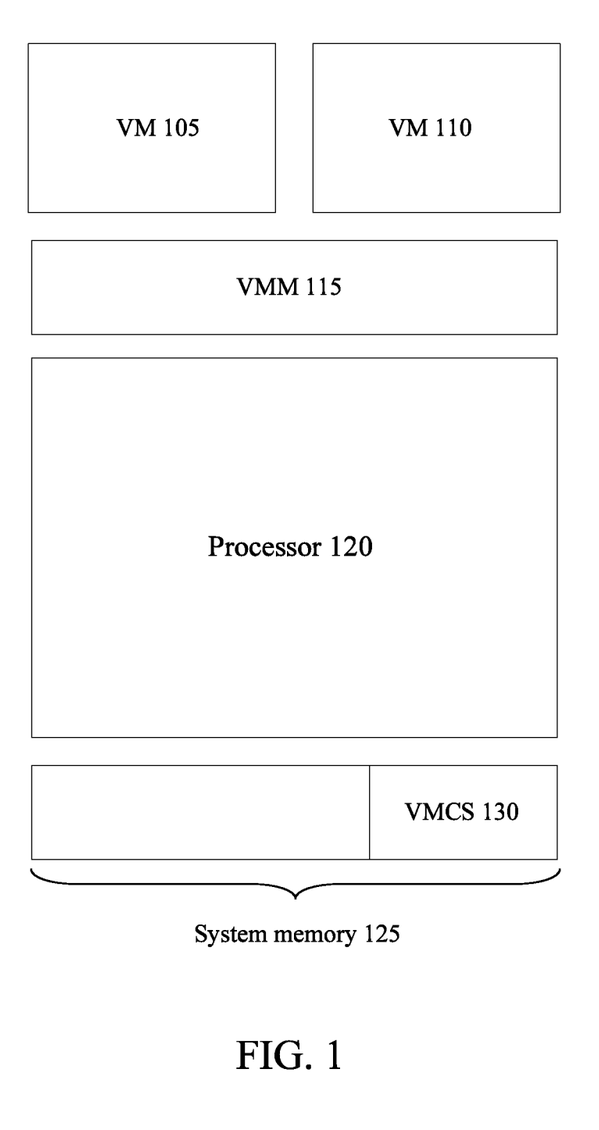
FIG. 1 illustrates an embodiment a system with two virtual machines, a virtual machine monitor, a processor, and a system memory.

FIG. 1 illustrates a virtual machine environment for interfacing guest software, also known as a virtual machine or a virtual machine program, with a processor 120. Specifically, FIG. 1 depicts a first virtual machine 105 and a second virtual machine 110. Virtual machines 105 and 110 may be any one of or any combination of the following: an operating system, an operating system specific application, a general application, software routines, or any other program that may be run on processor 120. In one embodiment, processor 120 has multiple logical processors. In another embodiment, processor 120 is one of multiple physical processors in a system.

FIG. 1 also illustrates a virtual machine manager (VMM) 115 to interface virtual machine 105 and virtual machine 110 with processor 120. In one embodiment, state and control information for VM 105, VM 110, and VMM 115 is stored in system memory 125. An example, FIG. 1 depicts virtual machine control structure (VMCS) 130 residing in system memory 125 to store the state and control information for VM 105, VM 110, and VMM 115. Although, FIG. 1 depicts VMCS 130 as residing in system memory 125, VMCS may reside in any memory structure located in the system, including a memory residing in processor 120 or a memory merely coupled to processor 120, such as system memory 125. As an advantage, if the VMCS resides in main system memory, then an instruction may reference a specific physical address merely supplying an offset to be added to an already established base address for the VMCS portion. This type of offset addressing typically reduces the architectural specific implementation problems that are associated with placing physically addressed memory in a microprocessor.

However, VMCS portion 130, as stated above is not limited to residing in system memory 125.

In one embodiment, VM 105 and 110, as well as VMM 115 issue instructions that linearly address system memory 125. Processor 120 then translates the linear addresses to physical addresses in system memory 125. In another embodiment, VM 105, VM 110, or VMM 115 issues an instruction that physically addresses system memory 125. Processor 120 then directly accesses the physical address in system memory 125 without address translation. Processor 120 and address translation will be discussed in more detail in reference to FIG. 2.

System memory 125 may be any type of access memory used in a system. In one embodiment, system memory 125 is a random access memory (RAM) device such as a static random access memory (SRAM), a dynamic random access memory (DRAM), a single data rate (SDR) RAM, a double data rate (DDR) RAM, any other multiple data rate RAM, or any other type of access memory. In another embodiment, system memory 125 is any other storage device associated with processor 120, including a hard-drive, a remotely located storage device, or any other short or long-term storage device.

Figure 2:
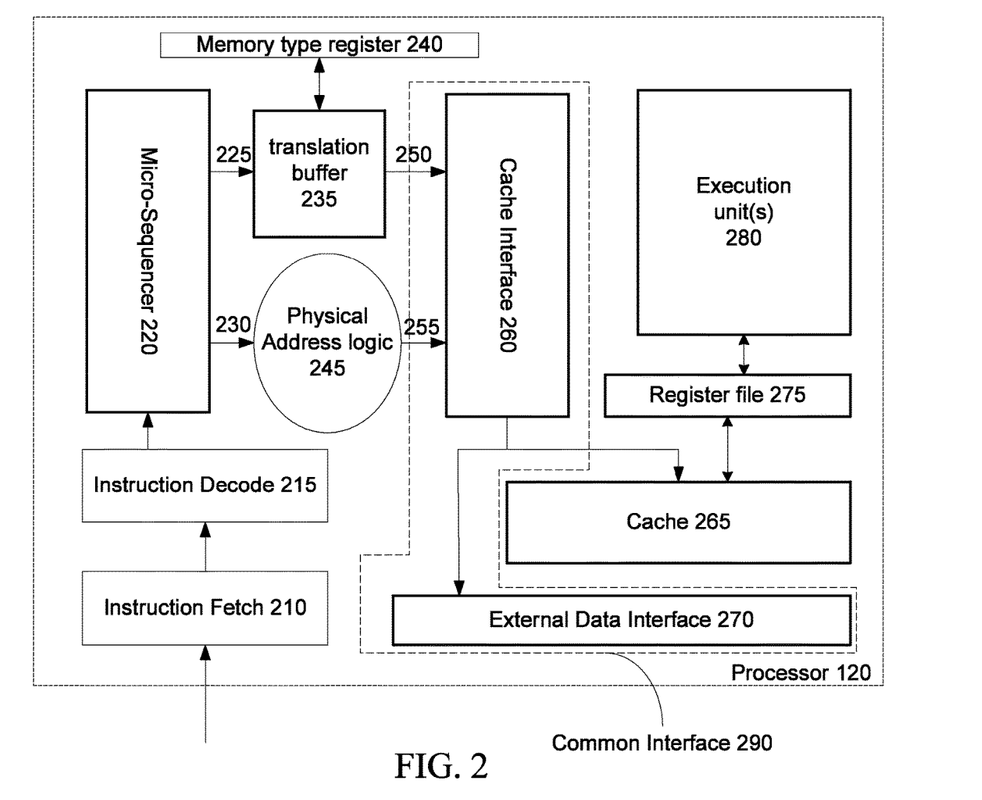
FIG. 2 illustrates a partial functional block diagram of the processor depicted in FIG. 1.

Turning to FIG. 2, an exemplary embodiment of processor 120 is illustrated. In one embodiment, processor 120 is a microprocessor capable of operating independently of another processor. In another embodiment, processor 120 is a co-processing element that operates in conjunction with other processing elements.

In one embodiment processor 120 includes a fetch unit, such as instruction fetch 210, which comprises logic for fetching and/or receiving instructions. As an example, an instruction includes a single operation to perform on a single or multiple data operands. As another example, an instruction includes multiple operations, also referred to as micro-operations, to be performed on a single or multiple data operands. An instruction that includes a plurality of operations is commonly referred to as a macro-instruction, while the individual operations are commonly referred to as micro-operations. As an example, a macro-instruction to operate on two data operands may include a plurality of micro-operations, wherein a first micro-operation instructs processor 120 to load a first data operand, a second micro-operation instructs processor 120 to load a second data operand, and a third micro-operation instructs processor 120 to operate on the first and second data operand. In one embodiment, instruction fetch unit 210 fetches fixed length instructions. In another embodiment, instruction fetch unit 210 fetches variable length instructions. In yet another embodiment, instruction fetch unit 210 fetches x86 instructions.

Processor 120 may also include instruction decode 215. In one embodiment, instruction decode 215 is a decode unit or decode logic for decoding instructions fetched by instruction fetch 210 including fixed length, variable length, and x86 instructions. As an example, decode logic decodes instructions fetched by instruction unit 210 into their individual micro-operations. In one embodiment, instruction decode 215 includes a micro-code read only memory for decoding complex instructions. In another embodiment, instruction decode 215 includes a low-level cache for storing recently fetched instruction or for storing recently decoded instructions. In yet another embodiment, instruction decode 215 includes branch prediction or speculation logic to aid in speculative instruction decode and execution.

Processor 120 also illustrates a micro-sequencer 220 coupled to instruction decode 215 and instruction fetch 210. In one embodiment, processor 120 is an in-order execution processor, which executes instructions and micro-operations in order as they are fetched and decoded. In one embodiment of an in order processor, fetched instructions are decoded and executed directly from the decode logic or cache storing decoded instructions. In an alternate embodiment, micro-sequencer 220 is present in the in-order execution processor to receive, pass-on, and track decoded micro-operations from instruction decode 215 and an instruction cache, not depicted.

In another embodiment, processor 120 is an out of order execution processor, wherein instructions and micro-operations are re-ordered and executed non-speculatively and/or speculatively. Therefore, micro-sequencer 220 may include out of order execution logic to execute micro-operation out of order and to track the micro-operations execution status, branch predication and update logic to track speculative branch execution and to update the status of each micro-operations execution status, retirement logic to validate the success of speculative branch execution, and other logic to execute instructions out of order. Both in-order execution and out-of-order execution processor design is well-known.

In one embodiment, a fetched and decoded instruction references or includes a micro-operation that references a virtual memory/linear address. In another embodiment, a fetched and decoded instruction references or includes a micro-operation that references a physical address. In yet another embodiment, a macro-instruction with a plurality of micro-operations includes a micro-operation that references a linear address and a micro-operation that references a physical address.

In one embodiment, linear addresses are passed to translation buffer 235, which is also typically referred to as a linear to physical address translator, a linear address translation unit, and a translation look-aside buffer (TLB). In one embodiment, translation buffer 235 receives a reference to a linear address and provides a representation of a physical address to a common interface, such as common interface 290. Common interface 290 will be discussed in more detail below.

Often a linear address is referred to as a virtual memory address in a processor that has virtual memory paging enabled. The reference to the linear address passed to translation buffer 235, in one embodiment, includes the linear address itself. In another embodiment, the address passed to translation buffer 235 includes a coded representation of the linear address or some other reference to a linear address that is decoded or manipulated to obtain a representation of a physical address. It is apparent that the virtual memory address is not limited to a linear address, but rather, is any form of virtual memory address that may be translated to a physical address.

In one embodiment, translation buffer 235 includes a look-up table for translating a virtual memory address to a physical address. In another embodiment, translation buffer 235 also includes translation logic to decode the input virtual memory address into a physical address. In yet another embodiment, translation buffer 235 includes or is associated with memory type register 240. In one embodiment, memory type register (MTR) 240, which is also referred to as a memory type read register (MTRR), reads and/or stores a memory type for common interface 290. As an illustrative example, a memory type readable or storable by MTR 240 is cacheable. In one embodiment when MTR 240 stores a cacheable memory type, translation buffer 235 provides a representation of a physical address to common interface 290, which is a cache interface, such as cache interface 260. In one embodiment, the representation of the physical address includes the actual physical address. In another embodiment, the representation of the physical address includes a tag for storing/writing the physical address in/to cache 265.

Another illustrative example of a memory type to be stored in MTR 240 is an un-cacheable memory type. In one embodiment, translation buffer 235 provides the translated representation of a physical address to common interface 290. In one embodiment common interface 290 is a data interface or data fetch logic, such as external data interface 270.

As an illustrative example, common interface 290 may be any interface logic operable to load a data operand associated with a physical address in processor 120, to request/fetch elements from the physical address in processor 120 or a system processor 120 is present in, or to snoop/fetch elements referenced by the physical address in a cache, such as cache 265. In one embodiment, an element includes a data operand. In another embodiment, an element includes an instruction. In yet another embodiment, an element includes a portion of state or control information. However, an element is not limited to an instruction, a data operand, state information, or control information.

Processor 120 may also include physical address logic 245, also referred to as physical addressing logic or a physical address unit. In one embodiment, physical address logic 245 takes a reference to a physical address and provides a representation of a physical address to common interface 290. As a first example, a reference to a physical address includes the physical address itself. As a second example, a reference to a physical address includes an offset from a base address in a physical memory. As a third example, a reference to a physical address includes a coded representation of a physical address or offset.

Figure 3:
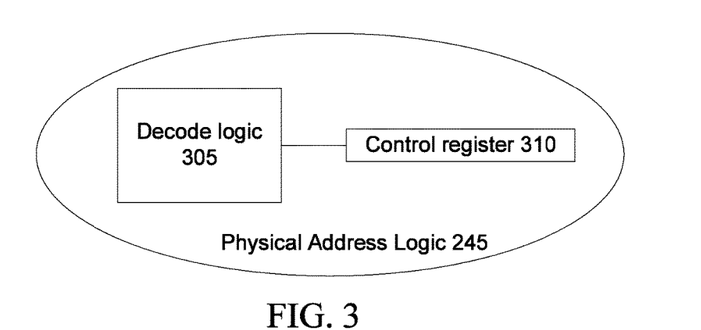
FIG. 3 illustrates an embodiment of the physical address logic depicted in FIG. 2.

In one embodiment, physical address logic, as shown in FIG. 3, also includes decode logic 305. As an example, decode logic 305 is operable to decode a coded physical address and/or generate a physical address from a supplied offset in the instruction or micro-operation. As a specific example, an earlier micro-operation supplies a base address for physical address logic 245 to use for future micro-operations. A later micro-operation includes a representation, which includes a coded representation of an offset. Physical address logic 245 decodes the offset and generates a physical address by adding the base address and offset. In another embodiment, the reference to the physical address is decoded by physical address logic 245 to also point to the next micro-operation for micro-sequencer 220 to supply. Co-pending application with Ser. No. 10/876,509 entitled Virtual Machine Control Structure Identification Decoder serial, discusses in more detail an example of an ID decode engine that may be used in physical address logic 245 to take a reference to a physical address and to provide a representation of the physical address.

In yet another embodiment, physical address logic 245 includes or is associated with control register 310, as shown in FIG. 3, to store a memory type. As a first example, a stored memory type is cacheable, also referred to as writeback (WB). As a second example, a stored memory type is un-cacheable (UC). In one embodiment, memory type register 240 and control register 310 stores the same memory type. In an alternate embodiment, memory type register 240 and control register 310 stores a different memory type.

As a first illustrative example, processor 120 includes at least physical address logic 245 with control register 310, translation buffer 235 associated with MTR 240 to store a cacheable memory type, cache interface 260, cache 265, and external data interface 270. Therefore, when a virtual memory address is translated by translation buffer 235, it checks the memory type stored in MTR 240 and provides the translated representation of a physical address to cache interface 260. Cache interface 260 checks cache 265 to see if a valid copy of the element that the translated physical address references is present. If cache 265 has a valid copy of the element, then the element is read from cache 265 into logic within processor 120, such as register file 275. Additionally, if a valid copy is not present in cache 265, external data interface 270 or some other data fetching logic reads the element referenced by the physical address from a location in a memory.

Continuing the example from above, in one embodiment, control register 310 stores an un-cacheable memory type. Even though, memory type register 240 stores a memory type of cacheable, control register 310 is not limited to the same memory type stored by MTR 240. If control register 310 did store a cacheable memory type, then physical address logic 245 provides the physical address to cache interface 260 and the same look-up process as described above occurs. However, if physical address logic 245 checks control register 310 and control register 310 stores an un-cacheable memory type, then physical address logic 245 provides a representation of a physical address directly to data fetching logic, such as external data interface 270. External data interface 270 then fetches the element from a memory location referenced by the physical address.

Although, control register 310 in the example above stored a memory type different from MTR 240, in another embodiment, physical address logic 245 reads MTR 240 and then stores that same memory type in control register 310. However, physical address logic is not limited to included or being associated with control register 310. In yet another embodiment, physical address logic 245 reads the memory type from MTR 240.

The examples above used write/stores as an example; however, in another embodiment, the same apparatus and methods are applicable to write and other instructions that include references to either virtual memory addresses or physical address. Modifying the illustrative example from above, if a write occurs, then the physical address of an element to be written to memory is provided to either cache interface 260 and/or external data interface 270. If the memory type is cacheable the element is written to cache 265 and then to a memory location by cache 265 or external data interface 270. If the memory type is un-cacheable the element is directly written to the memory location by external data interface 270.

Processor 120 may also include register file 275 and execution unit(s) 280. In one embodiment, register file 275 is operable to load and store data operands, as well as providing those data operands to execution resources, such as execution unit(s) 280. In one embodiment, execution unit(s) 280 is capable of operating on single or multiple data operands in serial and/or in parallel.

Although not specifically depicted, in other embodiments of processor 120 any one, any plurality, or any combination of the following may also be included in processor 120: a data path, an instruction path, arithmetic logic unit (ALU), a floating point calculation unit capable of executing a single instruction or multiple instructions to operate on single or multiple data operands in serial or in parallel, architecture state register(s), a bus controller, an interrupt controller, and an advanced programmable interrupt controller (APIC), a pre-fetch unit.

Figure 4:
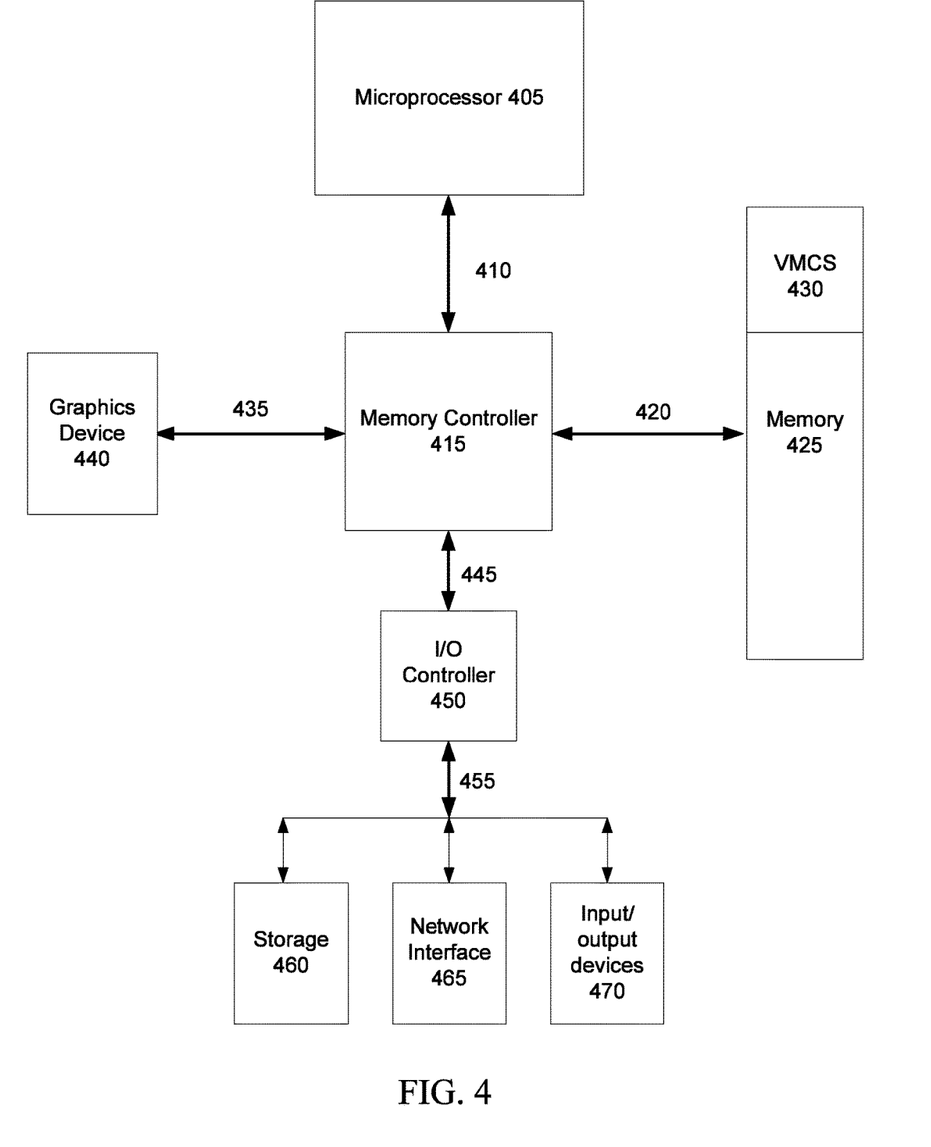
FIG. 4 illustrates an embodiment of a system having a microprocessor and a memory with a virtual machine control structure.

Turning to FIG. 4, an embodiment of a system is depicted that includes physical address logic 245 and VMCS 430. Microprocessor 405 is shown coupled by interconnect 410 to memory controller 415. Memory controller 415 is coupled to a graphics device 440 by interconnect 435. In an alternate embodiment, graphics device 440 is integrated in memory controller 415. Memory controller 415 is coupled to memory 425 by interconnect 420. In one embodiment, memory 425 is a system memory. In another embodiment, memory 425 is any memory device located in the system. Memory 425 is depicted as including VMCS portion 430 to store state and/or control information for a VMM and/or guest software running on the system.

Memory Controller 415 is also depicted as coupled to an input/output (I/O) controller 450 by interconnect 445. I/O controller 450 is coupled to storage 460, network interface 465, and input/output devices 470 by interconnect 455. In one embodiment, storage 460 is a hard-drive. In another embodiment storage 460 is a disk drive. In yet another embodiment, storage 460 is any static storage device in the system. In one embodiment, network interface 465 interfaces with a local area network (LAN). In another embodiment, network interface 465 interfaces with a larger network, such as the internet. Input/output devices 470 may include any user input or system related output devices, such as a keyboard, mouse, monitor, or printer.

Figure 5:
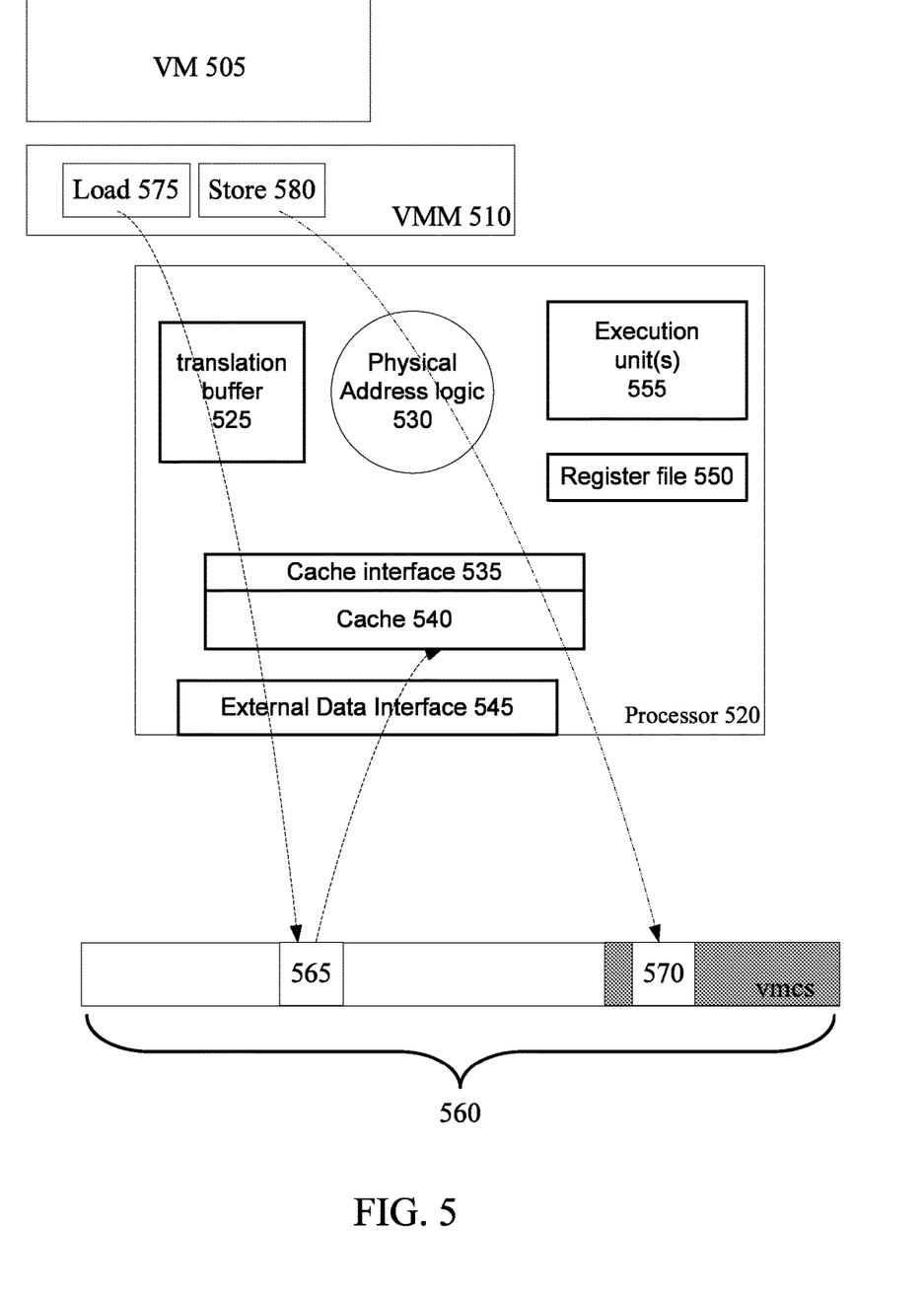
FIG. 5 illustrates an embodiment of an instruction linearly addressing a memory location and an instruction physically addressing a memory location.

Referring to FIG. 5, an example of loading an element from memory and storing an element in memory is illustrated. A first instruction, such as load 575, from VMM 510 includes an operation to load a first element from a first virtual/linear memory address. In one embodiment, the first element is an instruction. In another embodiment, the second element is a data operand. In a third embodiment, the first element is any other element commonly stored in memory. Load 575 is depicted as being generated by VM 505. However, in another embodiment, load 575 is generated by another guest software program running on processor 520. Translation buffer 525 translates the first virtual/linear memory address to a first physical memory address, which references a first memory location, such as first memory location 565 within memory 560. In one embodiment, memory 560 has a plurality of memory cells and first memory location 565 is at least one memory cell within the plurality of memory cells.

Translation buffer 525 also provides the first physical address to a cache interface 535 or directly to external data interface 545. If cache interface 535 receives the request with the first physical address, cache interface 535 checks cache 540 to see if a valid copy of the first element stored in first memory location 565 is present. If a valid copy is present then the first element is loaded into register file 550 or loaded into other processor logic 520. However, if translation buffer directly provided the first physical address to external data interface 545 or a valid copy of the first element within first memory location 565 is not present in cache 540, then external data interface 545 fetches the first element from first memory location 565. Once the first element is fetched, it is stored in cache 540 and/or loaded into register file 550. Register file 550 further loads the first element into execution unit(s) 555 for operation.

In addition, processor 520 fetches or receives a second instruction, such as store 580. Store 580 requests processor 520 to store a second element in a second physical address, which references a second memory location 570. In one embodiment, the second element is the first element previously loaded by load instruction 575. In another embodiment, the second element is a result of an operation on first element 575 executed by execution unit(s) 555 and updated in register file 550 and/or cache 540. In yet another embodiment, the second element is an unrelated element stored in processor 520. As stated above, store instruction 580 may include any representation of second physical address, including an offset to be added to a base address. Physical address logic 530, provides the second physical address to either cache interface 535 and/or external data interface 545 based on the stored memory type. External data interface 545 hen writes/stores the element to second memory location 570.

As can be seen from above, if a VMCS portion is maintained in a system memory, physical address logic in a microprocessor allows the microprocessor to receive either multiple instructions or single macro-instruction with references to both linear/virtual memory addresses and physical addresses. Additionally, the microprocessor is able to decode the addresses and provide physical addresses to interface logic to retrieve/load elements from the memory location referenced by the physical addresses without disabling paging, flushing a translation buffer, and re-enabling paging, which typically incurs large execution penalties.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in a illustrative sense rather than a restrictive sense.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   fetching, by a processor, instructions from a memory;
   decoding the instructions;
   executing the instructions;
   storing, in a cache, data to be processed during the execution of the instructions;
   storing, in a translation lookaside buffer (TLB), one or more virtual to physical address translations;
   storing, in a first register, a first indication of a first memory type or a second memory type for a first memory region; and
   storing, in a second register, a second indication of the first memory type or the second memory type for the first memory region,
   wherein, when both the first indication and the second indication correspond to the second memory type, data from the first memory region is treated in accordance with the second memory type, and
   wherein, when the first indication corresponds to the first memory type and the second indication corresponds to the second memory type, the data from the first memory region is treated in accordance with the first memory type.

2. The method of claim 1, wherein executing the instructions comprises executing one or more of the instructions to implement a virtualized execution environment comprising at least one virtual machine monitor (VMM) and a virtual machine control structure (VMCS), the VMM to interface one or more virtual machines (VMs) with the processor, and the VMCS to store a current execution state and control information associated with one or more of the VMs.

3. A method comprising:
fetching, by a processor, instructions from a memory;
decoding the instructions;
executing the instructions;
storing, in a cache, data to be processed during the execution of the instructions;
storing, in a translation lookaside buffer (TLB), one or more virtual to physical address translations;
storing, in a first register, a first indication of a memory type for a first memory region, wherein the first indication is selected from a group comprising a first memory type for which specified cache accesses are prevented and a second memory type for which the specified cache accesses are permitted;
storing, in a second register, a second indication of a memory type for the first memory region, wherein the second indication is selected from the group comprising the first memory type and the second memory type,
wherein, when the first indication and the second indication both indicate the second memory type, data from the first memory region is stored in the cache, and
wherein, when the second indication identifies the first memory type and the first indication identifies the second memory type, the data from the first memory region is treated in accordance with the first memory type.

4. A processor comprising:
instruction fetch circuitry to fetch instructions from a memory;
instruction decode circuitry to decode the instructions;
an execution circuit to execute the instructions;
a cache to store data to be processed by the execution circuit;
address translation circuitry comprising a translation lookaside buffer (TLB) to cache one or more virtual to physical address translations;
a first register to store a first indication of a first memory type or a second memory type for a first memory region; and
a second register to store a second indication of the first memory type or the second memory type for the first memory region,
wherein, when both the first indication and the second indication correspond to the second memory type, data from the first memory region is treated in accordance with the second memory type, and
wherein, when the first indication corresponds to the first memory type and the second indication corresponds to the second memory type, the data from the first memory region is treated in accordance with the first memory type.

5. The processor of claim 4, wherein the first register or the second register comprise a memory type register.

6. The processor of claim 5, wherein the first register or the second register comprise a memory control register.

7. The processor of claim 4 further comprising:
a register file comprising the first register and the second register.

8. The processor of claim 4, wherein the execution circuit is to execute one or more of the instructions to implement a virtualized execution environment comprising at least one virtual machine monitor (VMM) and a virtual machine control structure (VMCS), the VMM to interface one or more virtual machines (VMs) with the processor, and the VMCS to store a current execution state and control information associated with one or more of the VMs.

9. The processor of claim 4, wherein the first memory type comprises a memory type for which certain cache accesses are disabled.

10. The processor of claim 9, wherein the certain cache accesses comprise memory writes.

11. The processor of claim 9, wherein the second memory type comprises a write-back memory type.

12. A processor comprising:
instruction fetch circuitry to fetch instructions from a memory;
instruction decode circuitry to decode the instructions;
an execution circuit to execute the instructions;
a cache to store data to be processed by the execution circuit;
address translation circuitry comprising a translation lookaside buffer (TLB) to cache one or more virtual to physical address translations;
a first register to store a first indication of a memory type for a first memory region, wherein the first indication is selected from a group comprising a first memory type for which specified cache accesses are prevented and a second memory type for which the specified cache accesses are permitted; and
a second register to store a second indication of a memory type for the first memory region, wherein the second indication is selected from the group comprising the first memory type and the second memory type,
wherein, when the first indication and the second indication both indicate the second memory type, data from the first memory region is stored in the cache, and
wherein, when the second indication identifies the first memory type and the first indication identifies the second memory type, the data from the first memory region is treated in accordance with the first memory type.

13. The processor of claim 12, wherein the first register or the second register comprise a memory type register.

14. The processor of claim 12, wherein the first register or the second register comprise a memory control register.

15. The processor of claim 12, wherein the execution circuit is to execute one or more of the instructions to implement a virtualized execution environment comprising at least one virtual machine monitor (VMM) and a virtual machine control structure (VMCS), the VMM to interface one or more virtual machines (VMs) with the processor, and the VMCS to store a current execution state and control information associated with one or more of the VMs.

16. The processor of claim 12, wherein the specified cache accesses comprise memory writes.

17. The processor of claim 12, wherein the second memory type comprises a write-back memory type.

18. A non-transitory machine-readable storage medium having machine instructions stored therein that, when executed by a processor, cause the processor to:
fetch instructions from a memory;
decode the instructions;
execute the instructions;
store, in a cache, data to be processed during the execution of the instructions;
store, in a translation lookaside buffer (TLB), one or more virtual to physical address translations;
store, in a first register, a first indication of a first memory type or a second memory type for a first memory region; and store, in a second register, a second indication of the first memory type or the second memory type for the first memory region, wherein, when both the first indication and the second indication correspond to the second memory type, data from the first memory region is treated in accordance with the second memory type, and wherein, when the first indication corresponds to the first memory type and the second indication corresponds to the second memory type, the data from the first memory region is treated in accordance with the first memory type.

19. The non-transitory machine-readable storage medium of claim 18, wherein the machine instructions are further to cause the processor to execute one or more of the instructions to implement a virtualized execution environment comprising at least one virtual machine monitor (VMM) and a virtual machine control structure (VMCS), the VMM to interface one or more virtual machines (VMs) with the processor, and the VMCS to store a current execution state and control information associated with one or more of the VMs.

20. A non-transitory machine-readable storage medium having machine instructions stored therein that, when executed by a processor, cause the processor to:

fetch instructions from a memory;
decode the instructions;
execute the instructions;
store, in a cache, data to be processed during the execution of the instructions;
store, in a translation lookaside buffer (TLB), one or more virtual to physical address translations;
store, in a first register, a first indication of a memory type for a first memory region, wherein the first indication is selected from a group comprising a first memory type for which specified cache accesses are prevented and a second memory type for which the specified cache accesses are permitted;
store, in a second register, a second indication of a memory type for the first memory region, wherein the second indication is selected from the group comprising the first memory type and the second memory type,
wherein, when the first indication and the second indication both indicate the second memory type, data from the first memory region is stored in the cache, and
wherein, when the second indication identifies the first memory type and the first indication identifies the second memory type, the data from the first memory region is treated in accordance with the first memory type.

* * * * *